MOLDABLE LIPSTICK COMPOSITIONS CONTAINING AN EMULSIFIER

Felix Lachampt, Franconville, Andre Viout, Paris, and Guy Vanlerberghe, Mitry-Mory, France, assignors to Société Anonyme dite: L'Oreal
No Drawing. Filed Dec. 26, 1967, Ser. No. 693,190
Claims priority, application Luxembourg, Dec. 28, 1966, 52,708
Int. Cl. A61k 7/02
U.S. Cl. 424—64                                6 Claims

ABSTRACT OF THE DISCLOSURE

A new material for use in making lipsticks comprising a moldable mixture of oils and waxes in combination with an emulsifier of the water-in-oil type having a high affinity for water, said emulsifier being selected from the group consisting of the magnesium salts of certain polyoxyalkylene fatty alcohols, certain oxypropylene-oxyethylene alcohols, and certain oxypropylene polyglycerol alcohols.

---

Present day lipsticks are mixtures of waxes and oils which may be poured while hot into molds in which they are cooled to form sticks.

The lipsticks most commonly used are colored by pigments dispersed throughout the stick, and are known in the trade as "grease sticks." They color the lips by leaving thereon a layer of greasy material containing the colored pigments.

With other types of lipstick the mucous membrane of the lips is slightly tinted by introducing into the composition a dye consisting of the eosin acid often called "bromeosin."

Another type of lipstick presently in use makes it possible to truly color the lips in an almost indelible manner. These lipsticks contain, in addition to the greasy part, emulsifiers or soaps which permit the incorporation of dyes dissolved in a certain amount of water.

This last type of lipstick is less and less commonly used because it has substantial disadvantages. In the first place, the coating applied to the lips is not considered too attractive because it lacks sheen. Moreover, the water progressively evaporates from the layer of material applied to the lips thereby creating some slight discomfort. But, above all, this type of lipstick tends to dry out the mucous membranes to which it is applied.

The present invention relates to a new type of lipstick material which overcomes these disadvantages.

While the lipstick material according to the invention spreads about as well as and has the same substantive properties as those of a grease stick, it adhere perfectly even when applied to moist lips. This makes it possible to provide particularly tenacious coloring for the lips without recourse to eosin acids.

In addition, the lipstick material according to the invention has the advantage of having moisturizing properties which prevent drying of the lips.

Moreover, the lipsticks according to the invention may be stored for a very long time without any shrinking of the stick, since the loss of water is negligible.

It is an object of the present invention to provide as a new article of manufacture a new lipstick material characterized by the fact that it comprises in combination a mixture of waxes and oils which may be molded into a stick, at least one emulsifier of the "water-in-oil" type having the property of being soluble in oil and insoluble in water, while having a great affinity for water, together with any other conventional cosmetic ingredients deemed appropriate. By "having a great affinity for water" is meant that the emulsifier will retain water in an amount equal to 8–18% of the weight of the emulsifier, at a humidity of 93%.

The lipstick material according to the invention may contain from about 5 to about 25% by weight of the emulsifying compounds of this invention which are soluble in oil and insoluble in water, and have a great affinity for water. If less than 5% is used, the hydrating effect is inadequate. If more than 25% is used the product is no longer suitable for use in lipsticks.

In a preferred embodiment of the invention, the above lipsticks also contain a certain amount of moisture or water which may amount to as much as 10% by weight of the total composition.

The water contained in the lipstick is retained in a manner which has not as yet been completely determined. However, this quantity of water, when introduced into the lipstick, makes it possible to color the lipstick by incorporating one or more water soluble dyes therein.

Among those emulsifiers which are soluble in oil but insoluble in water, and which have a strong affinity for water, which will hereinafter be referred to as the "active ingredients," are the following, but this list is by no means complete:

The magnesium salts of the succinic esters of polyoxyalkylene fatty alcohols having the formula:

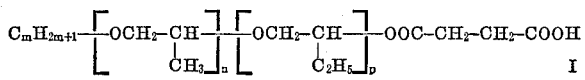

in which:

$m$ has an average value between 12 and 18 inclusive,
$n$ and $p$ have an average value between 0 and 12 inclusive, and the sum of $n$ and $p$ has an average value between 2 and 12;

The oxyproplene-oxyethylene alcohols having the formula;

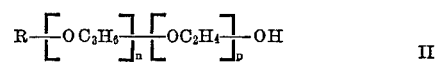

in which:

R is saturated linear alkyl radical comprising from 12 to 20 and preferably 16 to 18 carbon atoms;
$n$ has an average value between 1 and 8 inclusive, and preferably between 2 and 5 inclusive;
$p$ is a number having the maximum possible value compatible with insolubility of the alcohol in the water, falling usually between 1 and 6 and preferably between 2 and 4, inclusive.

The oxypropylene-polyglycerol alcohols having the following formula:

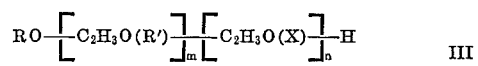

in which:

R is a saturated aliphatic radical having from 12 to 30 carbon atoms and preferably from 16 to 18,
R' is a methyl or ethyl radical,
X is a hydroxymethyl radical (—CH$_2$OH)
$m$ has an average value between 1 and 10 inclusive and preferably between 2 and 6 inclusive,
$n$ has an average value equal to or greater than 1 and lower than or equal to 5.

The compounds represented by Formula I can be made in accordance with U.S. Pat. 3,419,665. As disclosed therein, fatty alcohols are reacted with propylene oxide or butylene oxide or a mixture thereof in the presence of an alkaline catalyst (sodium or sodium methylate, for example, in the ratio of about 0.1 to 0.5% of sodium in proportion to the fatty alcohol).

The reaction is preferably carried out in an autoclave under pressure, at a temperature between 100 and 150° C. The resulting product is then washed with an aqueous solution containing 10 to 20% methanol.

The polyoxyalkylene fatty alcohols are then esterified with succinic anhydride in the presence of pyridine at a temperature of about 90 to 100° C. The esterification takes about 3 hours and the proportions in the starting compositions are: 1 mol of polyoxyalkylene alcohol, 1.1 mols of succinic anhydride and 2 mols of pyridine. A practically complete esterification is obtained.

In order to prepare the magnesium salt of the ester introduced in this manner, the succinic monoester is neutralized by a stoichiometric quantity of KOH or NaOH at 40% in the presence of enough water to produce an isotropic solution at a concentration of N/3 at the end of the process. This neutralization is carried out while the composition is being vigorously agitated at a temperature of about 80° C.

The magnesium salt is precipitated at once, using an excess of magnesium chloride in solution. Two successive washings will then suffice to obtain the desired magnesium salt.

The compounds represented by Formula II can be made in accordance with U.S. Pat. 3,489,690. As disclosed therein, the oxypropyleneoxyethylene alcohols are produced by placing the fatty alcohol and propylene oxide under pressure in the presence of a basic catalyst at a temperature between 110 and 180° C., and preferably about 130–140° C., after which the ethylene oxide is polycondensed with the alcohol at a temperature between about 120–180° C., and preferably at about 155° C., using a catalyst such as sodium in the proportion of 0.20 to 0.25% of the weight of the oxypropylenated alcohol, for example. The water-soluble products are then eliminated by washing with water.

As catalyst for the oxypropylenation, one can use an alkaline catalyst such as sodium or sodium methylate, which can be present in the proportion of from 0.1 to 1% by weight of the alcohol. Concentrations of 0.25% and 0.4–0.5% respectively, appear to give the best results in the cases of sodium and sodium methylate. It is also possible to use for the same purpose acid catalysts such as the Lewis acids, for example, boron fluoride or stannic chloride.

Catalysts are usually used in concentrations lying between 0.1 and 1% of the total mass of the reacting material. The reaction is ordinarily carried out at temperatures between 25 and 150° C., either in an autoclave or in a vessel communicating with the atmosphere through a reflux condenser.

The oxypropylenated fatty alcohol which is obtained in a first step can advantageously be purified by elimination of volatile materials under vacuum, or by washing. The final product obtained after reaction with ethylene oxide is washed in water to eliminate water-soluble components.

The compounds represented by Formula III can be made in accordance with copending application S.N. 677,047, filed Oct. 23, 1967. As disclosed therein, the oxypropylene-polyglycerol alcohols are produced by polycondensing on a fatty alcohol an epoxide or mixture of epoxides having the formula $$R'-CH-CH_2$$
$$\diagdown O \diagup$$

wherein R' is methyl or ethyl. Thereafter there is polycondensed on the alcohol a glycerol epihaloghydrin or a polyhalogenated glycidyl polyether having the formula

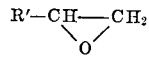

wherein Y is —CH$_2$Z,

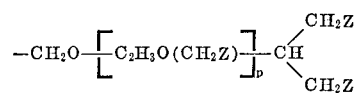

or

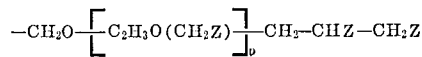

wherein Z is a halogen atom, preferably, chlorine or bromine. These polycondensations are carried out in the presence of an acid catalyst such as boron fluoride or stannic chloride at a temperature between 25–150° C. In a second step the compounds obtained in the first step are hydroxylated by means of an alkaline salt of carboxylic acid, perferably in a solvent which not only makes the reagents miscible but also facilitates the separation of the mineral halide formed.

Preferably, the polycondensation takes place in an autoclave or in a container which communicates with the atmosphere through a reflux condenser. When this polycondensation catalyst is boron fluoride, it is used in the form of a complex with acetic acid or ether. The quantity of boron fluoride, expressed in terms of BF$_3$ per 100 g. of reagents, is between 0.1% and 1% and preferably between 0.4 and 0.5%. It is preferred that the temperature be kept below 100° C., for example, between 70 and 80° C.

With respect to the hydroxylation step, it should be noted that the alkaline salt of carboxylic acid used can advantageously be an acetate, in stoichiometric proportions, or slightly in excess (10 to 15% at the maximum) in proportion to the halogenated compound which participate in the reaction.

The solvents selected for hydroxylation act by progressive alcoholysis of the esters formed in an intermediate stage. Among the solvents having the requisite properties are propylene glycol, di-propylene glycol, diethylene glycol and its ethers, ethylene glycol, hexylene glycol and butoxy-2-ethanol, the boiling points of which are high enough to make it unnecessary to use an autoclave. In general, it has been found that the weight of solvent to be used during the hydroxylation step must be equal to at least 50% of that of the polyhalogenated ether which is to be hydroxylated, and preferably, to 100 to 400% thereof. The hydroxylation reaction must be carried out at a temperature high enough for the reaction to occur with reasonable rapidity and low enough to avoid degradation of the products produced. A temperature between 150° C. and 200° C., and preferably between 180° C. and 190° C., meets these conditions.

In order to avoid coloring the products obtained during the hydroxylation reaction, it suffices to add reducing agents such as sodium hypophosphite or the alkaline borohydrides.

The crude product of this process can be advantageously purified by washing it in hot water, thus eliminating the water-soluble impurities, and particularly the electrolytes, whch is especially desirable.

Alcohols in which R is less than 12 do not produce the desired emulsifying effect. While alcohols according to Formulas I and II having more than 20, and those according to Formula III having more than 30 carbon atoms, would presumably be operative, they are not presently available at economical prices.

Compounds according to Formula I in which $n$ is more than 12 are not utilizable because they become crystallized. Then again it is very difficult to condense more than 12 molecules of oxyethylene on an oxypropylene alcohol.

In a preferred embodiment of the invention, the lip rouge contains, in admixture with the emulsifiers which are soluble in oil and insoluble in water, a polyglycerol alcohol having the formula:

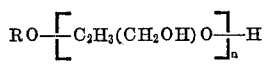

in which:

R indicates a saturated aliphatic radical having 12 to 30 carbon atoms, and $n$ may have any value between 1 and 4.

The introduction of this compound which is especially soluble in water, makes it possible to produce emulsifying compositions of the "water-in-oil" type having the property of dissolving alkaline eosinates, so as to permit the incorporation of these dyes into the lipstick material in the dissolved state.

In accordance with the invention, the polyglycerol alcohols which may be used conjointly with emulsifiers which are soluble in oil and not in water, may constitute from 1 to 20% of the total weight of the lipstick material.

According to the preferred method of preparing lipsticks according to the invention, the fatty constituents are first melted.

When the formulation comprises water or aqueous constituents, these are first heated to about 90° C. and then incorporated slowly into the fatty constituents, while stirring vigorously.

The mixture is then cooled under agitation until solidification is complete.

The composition obtained in this manner is then ground with the pigments and dyes in a cylinder mill.

The colored substance thus obtained is then reheated above its melting point and poured into molds in a conventional manner.

In order to color the lipstick, pigments or lakes which are listed by U.S. regulations as suitable for cosmetic use are employed.

Bromeosin dyes may also be used as soluble dyes.

The lipsticks according to the invention have the advantage of effectively inhibiting the drying out of the mucous membrane of the lips because they contain substantial quantities of active ingredients which are insoluble in water but have a great affinity therefor, so that these ingredients, while soluble in oil, retain a substantial quantity of water, which may be derived from either the lipstick material itself or from the saliva which comes in contact therewith after the lipstick has been applied.

In order that the invention may be better understood, several embodiments thereof will now be described.

EXAMPLE I

A lipstick material is prepared which has the following composition:

Oxypropylene-polyglycerol alcohol having the formula:

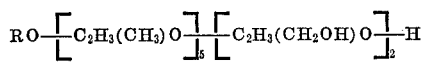

In which

R is a stearoyl radical _____ 15
Carnauba wax _____ 5
Ozokerite _____ 15
Water _____ 5
Oleic alcohol _____ 5
Castor oil _____ 55
Eosin _____ 2

The result is a lip rouge which is easy to apply, imparts a long-lasting color to the lips, and has a clearly moisturizing effect.

EXAMPLE II

A lipstick material having the following composition is prepared:

Oxpropylene-polyglycerol alcohol having the formula:

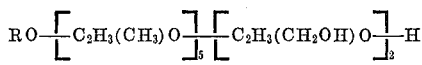

in which

| | G. |
|---|---|
| R is a stearoyl radical | 20 |
| Carnauba wax | 3 |
| Candelilla wax | 10 |
| Ozokerite | 5 |
| Beeswax | 4 |
| Vaseline oil | 3 |
| Castor oil | 55 |
| Pigments | 10 |

EXAMPLE III

A lipstick material having the following composition is prepared:

Magnesium salt of the composition having the formula:

$$C_{18}H_{37}\text{---}\left[\text{O CH}_2\text{---CH}\atop\text{CH}_3\right]_4\text{---O---}\underset{\underset{O}{\parallel}}{C}\text{---CH}_2\text{---CH}_2\text{---COOH}$$

| | Grams |
|---|---|
| | 5 |
| Natural bleached ozokerite wax | 4 |
| Carnuba wax | 6 |
| Beeswax | 12 |
| Oleic alcohol | 5 |
| Lanolin | 12 |
| Isopropyl myristate | 3 |
| Castor oil | 53 |
| Pigments | 10 |

EXAMPLE IV

An indelible lipstick according to the invention and having the following composition is prepared:

$$C_{18}H_{37}\text{---}\left[\text{O CH}_2\text{---CH}\atop\text{CH}_3\right]_{4.8}\left[\text{O CH}_2\text{---CH}_2\right]_{5.5}\text{---OH}$$

| | Grams |
|---|---|
| | 10 |
| Yellow carnuba wax | 4.8 |
| Natural bleached ozokerite wax | 19.2 |
| Alkyl myristate | 8 |
| Lanolin | 12 |
| Oleic alcohol | 8 |
| Cetyl ricinoleate | 12 |
| Paraffin oil | 16 |
| Eosin | 2 |
| Water | 8 |

EXAMPLE V

An indelible lipstick according to the invention and having the following composition is prepared:

| | G. |
|---|---|
| Trioxyethylene oleic alcohol sold under the trademark Volpo 3 by the Croda Co. | 20 |
| Carnauba wax | 3 |
| Natural bleached ozokerite wax | 7 |
| Microcrystalline wax | 8 |
| Oleic alcohol | 5 |
| Butyl myristate | 3 |
| Lanolin | 10 |
| Cetyl ricinoleate | 10 |
| Vaseline oil | 5 |
| Castor oil | 27 |
| Eosin | 2 |
| Water | 2 |

EXAMPLE VI

A grease type lipstick material according to the invention and having the following composition is prepared:

| | G. |
|---|---|
| Emulsifier based on alcohols and lanolin esters and sold under the trademark Alcolan 40 by the Robinson Company | 20 |
| Carnauba wax | 3 |
| Natural bleached ozokerite wax | 7 |
| Microcrystalline wax | 8 |
| Oleic alcohol | 5 |
| Butyl myristate | 3 |
| Lanolin | 10 |
| Cetyl ricinoleate | 10 |
| Vaseline oil | 5 |
| Castor oil | 27 |
| Pigments | 10 |
| Water | 2 |

EXAMPLE VII

A lipstick material exemplifying the invention and having the following composition is prepared:

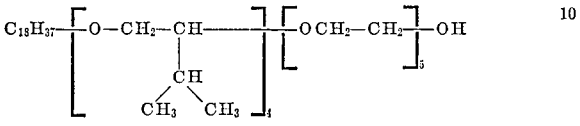 10

| | Grams |
|---|---|
| Yellow carnauba wax | 4.8 |
| Natural bleached ozokerite | 19.2 |
| Alkyl myristate | 8 |
| Lanolin | 12 |
| Oleic alcohol | 8 |
| Cetyl ricinoleate | 12 |
| Paraffin oil | 16 |
| Eosin | 2 |
| Water | 8 |

EXAMPLE VIII

An indelible lipstick having the following composition is prepared:

| | Gram |
|---|---|
| Carnauba wax | 3 |
| Ozokerite | 18 |
| Acetoglyceride | 5 |
| Lanolin | 15 |
| Lecithin | 5 |
| Ricinocetyl | 5 |
| "Dragoco" purcellin oil | 7 |
| Mineral oil | 20.5 |
| Potassium eosinate | 1.5 |

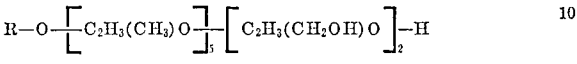 10

R = Stearyl alcohol

EXAMPLE IX

A transparent lipstick material is made from the following materials:

| | Grams |
|---|---|
| Carnauba wax | 4 |
| Ozokerite | 10 |
| Candebilla wax | 6 |
| Beeswax | 5 |
| Lanolin | 10 |
| Cetyl myristate | 6 |
| Oleic alcohol | 12 |
| Cetyl ricinoleate | 12 |
| Vasoline oil | 25.5 |
| Sodium eosinate | 0.5 |

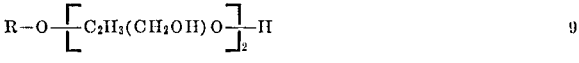 9

R = Isostearyl alcohol

EXAMPLE X

An indelible lipstick material is made from the following materials:

| | Grams |
|---|---|
| Carnauba wax | 3.5 |
| Ozokerite | 15 |
| Beeswax | 5 |
| Oleic alcohol | 12 |
| Butyl myristate | 6 |
| Lanolin | 10 |
| Vaseline | 31.5 |

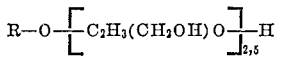 8 in which formula R = Lanolin alcohol

| | |
|---|---|
| Eosin | 2 |
| Water | 7 |

EXAMPLE XI

A greasy lipstick material having the following composition is prepared:

| | Grams |
|---|---|
| Viscous oil | 40.1 |
| Beeswax | 5 |
| Ozokerite | 20 |
| Lanolin | 20 |

$$R-O\left[C_2H_3(CH_2OH)O\right]_4 H \quad 3$$

R = Lanolin alcohol $$R-O\left[C_2H_3(CH_3)O\right]_4-\left[C_2H_3(CH_2OH)O\right]_2-H \quad 7$$

R = Stearyl alcohol

Pigments and bromo-acids ... 4.9

What is claimed is:

1. A lipstick composition comprising a color, a moldable amount of a mixture of oil and wax, and as an emulsifying agent a member selected from the group consisting of (a) a magnesium salt of a succinic ester of a fatty polyoxyalkyl alcohol having the formula $$C_mH_{2m+1}\left[OCH_2-CH\atop CH_3\right]_n\left[OCH_2-CH\atop C_2H_5\right]_p-OOC-CH_2-CH_2-COOH$$

wherein m is an integer of 12–18;

n and p have a value of 0–12 with the proviso that the sum of n plus p lies between 2 and 12 inclusive;

(b) an oxypropylene-oxyethylene alcohol having the formula $$R\left[OC_3H_6\right]_n\left[OC_2H_4\right]_p-OH$$

wherein

R is saturated linear alkyl having from 12 to 20 carbon atoms;

n is an integer of 3–8;

p is a number having the maximum value compatible with the insolubility of said oxypropylene-oxyethylene alcohol in water; and (c) an oxypropylene-polyglycerol alcohol having the formula $$RO\left[C_2H_3(R')O\right]_m\left[C_2H_3(X)O\right]_n-H$$

wherein

R is alkyl having from 12 to 30 carbon atoms;

R' is selected from the group consisting of methyl and ethyl;

X is —CH₂OH;

m has a value of 1–10 and n has a value of 1–5;

said emulsifying agent being soluble in oil and insoluble in water and being present in amounts of 5-25 percent by weight of the total composition.

2. The lipstick composition of claim 1 which includes up to 10 percent by weight of water.

3. The lipstick composition of claim 1 wherein the emulsifying agent is an oxypropylene-polyglycerol alcohol defined in (c) wherein R has a value between 12-30, R' is methyl, X is —$CH_2OH$, $m$ is 5 and $n$ is 2.

4. The lipstick composition of claim 1 which includes a polyglycerol alcohol having the formula

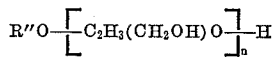

wherein R" is alkyl having 12-30 carbon atoms and $n$ has a value of 1-4.

5. The lipstick composition of claim 4 wherein R" is stearyl.

6. A lipstick composition comprising a color, a moldable amount of a mixture of oil and wax, and as an emulsifying agent a polyglycerol alcohol having the formula:

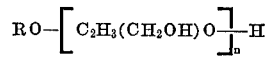

wherein R is alkyl having 12-30 carbon atoms and $n$ is 1-4, said emulsifying agent being present in amounts from 1-20 percent of said composition.

References Cited

UNITED STATES PATENTS

| | | | |
|---|---|---|---|
| 3,235,457 | 2/1966 | Laden | 424—65 |
| 3,285,945 | 11/1966 | Wember | 260—485 G |

OTHER REFERENCES

Chem. Abstracts, vol. 66, 1967, p. 58805v.

JEROME D. GOLDBERG, Primary Examiner

V. D. TURNER, Assistant Examiner